Figure 1:
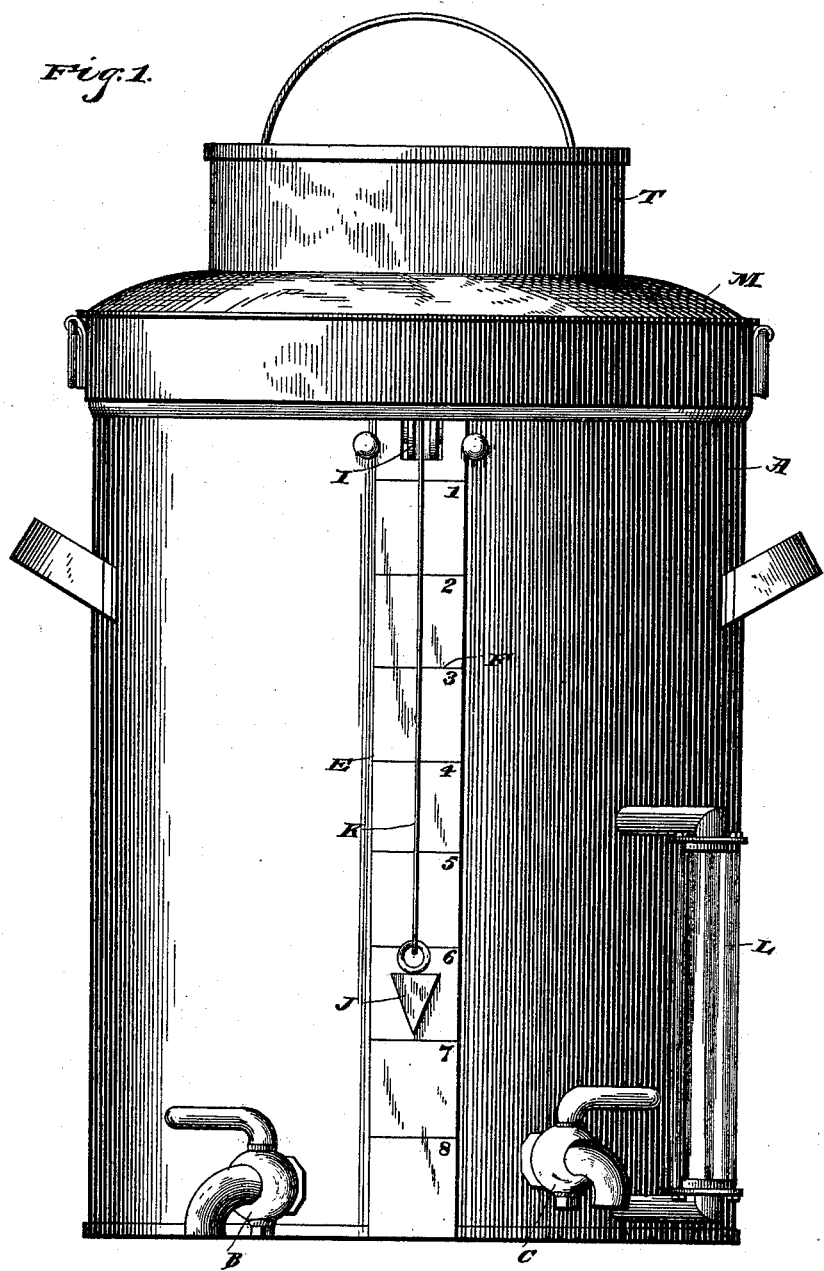

(No Model.) 3 Sheets—Sheet 1.

W. H. DEEMER.
INDICATING DEVICE FOR LARD COOLERS AND PURIFIERS.

No. 513,381. Patented Jan. 23, 1894.

Witnesses
B. S. Ober

Inventor
Wm. H. Deemer,
By his Attorneys,
C. A. Snow & Co.

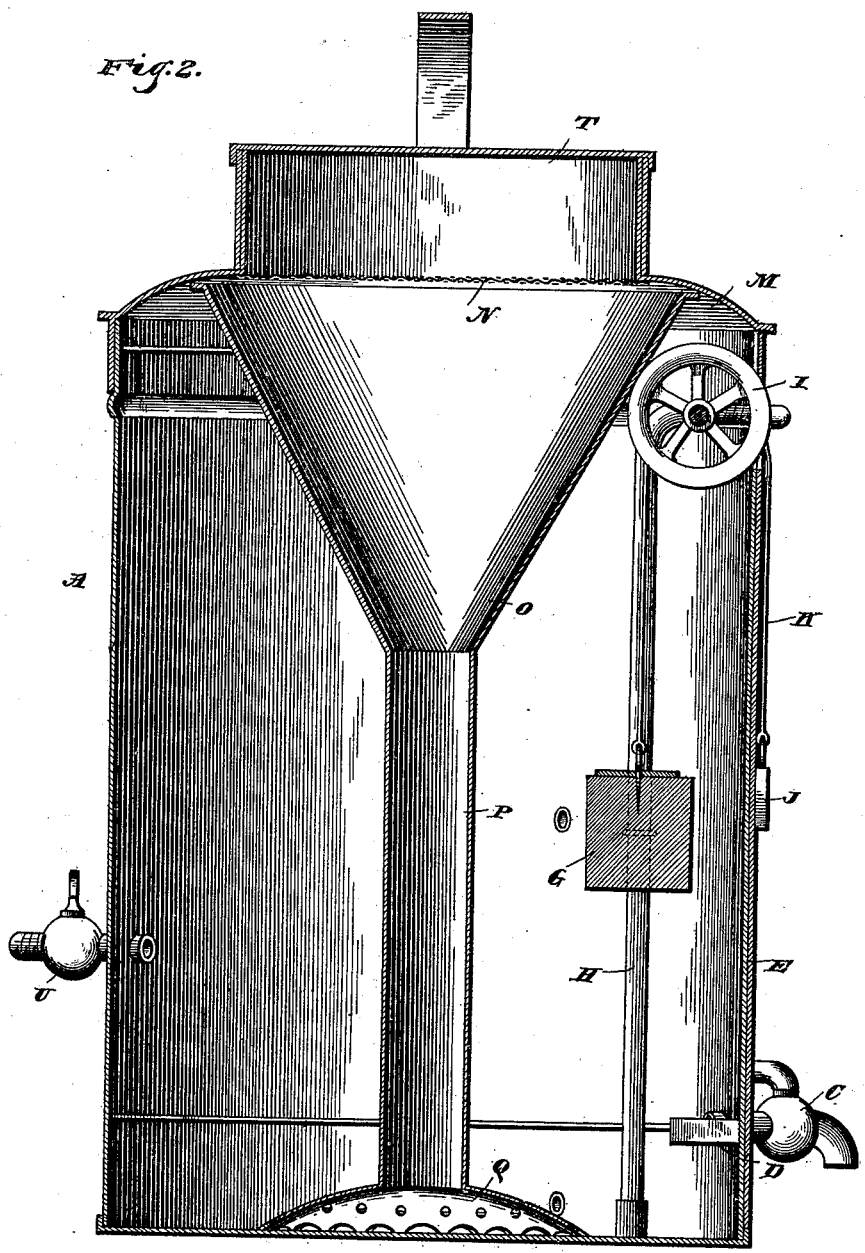

(No Model.) 3 Sheets—Sheet 3.
W. H. DEEMER.
INDICATING DEVICE FOR LARD COOLERS AND PURIFIERS.
No. 513,381. Patented Jan. 23, 1894.
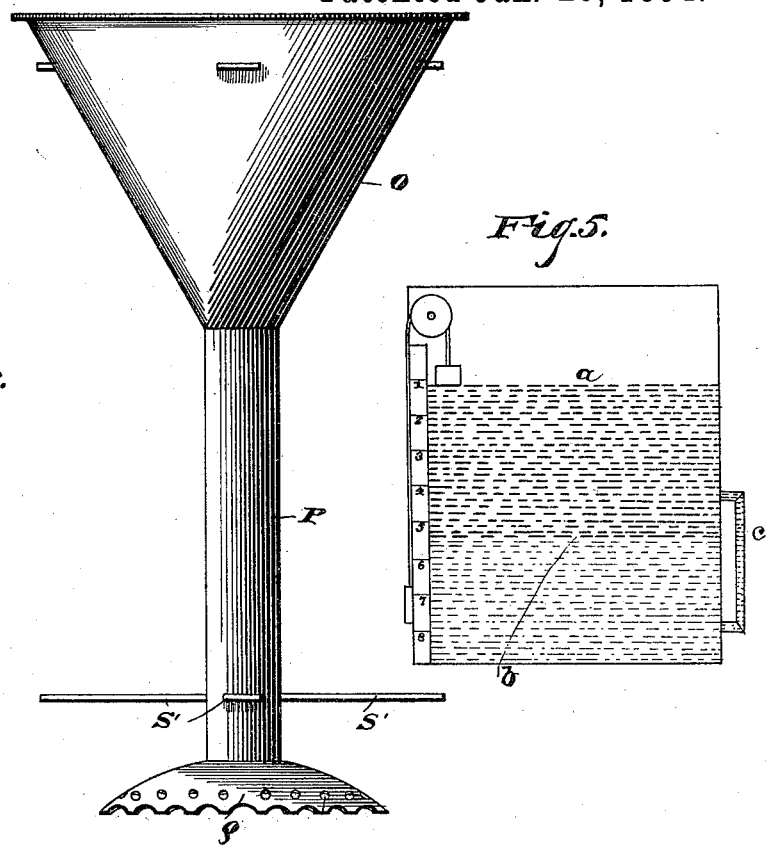
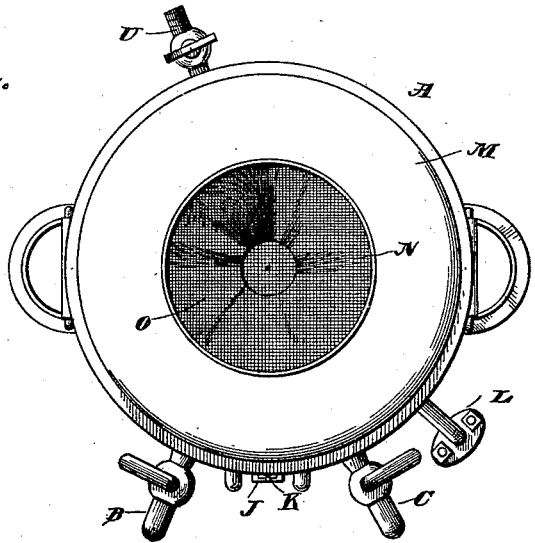
Witnesses
B. S. Ober
[signature]
Inventor
Wm. H. Deemer
By his Attorneys,
C. A. Snow & Co.
THE NATIONAL LITHOGRAPHING COMPANY,
WASHINGTON, D. C.

UNITED STATES PATENT OFFICE.

WILLIAM H. DEEMER, OF JOPLIN, MISSOURI.

INDICATING DEVICE FOR LARD COOLERS AND PURIFIERS.

SPECIFICATION forming part of Letters Patent No. 513,381, dated January 23, 1894.

Application filed July 30, 1892. Serial No. 441,774. (No model.)

*To all whom it may concern:*

Be it known that I, WILLIAM H. DEEMER, a citizen of the United States, residing at Joplin, in the county of Jasper and State of Missouri, have invented a new and useful Lard Cooler and Purifier, of which the following is a specification.

My invention relates to lard coolers and purifiers, and refers particularly to means for indicating the quantity of lard in the cooler.

The object of my invention is to provide a device which is simple in construction and may be readily applied to a lard cooler of any ordinary construction, and which, in connection with the water-gage, will indicate the amount of lard contained in the receptacle.

Further objects of my invention will appear in the following description, and the novel features thereof will be particularly pointed out in the claim.

In the drawings: Figure 1 is a side view of a cooler provided with a gage embodying my improvements. Fig. 2 is a vertical central sectional view of the same. Fig. 3 is a side view of the funnel and conductor-tube. Fig. 4 is a plan view with the lid removed. Fig. 5 is a diagramatic view to show the co-operation of the water gage and the indicator.

A represents the cylindrical body-portion of the cooler, which is provided at or near its bottom with a water outlet or faucet B, and at a point above the plane of said water faucet with a lard-outlet or faucet C. The inner end of the faucet C projects into the body of the cooler and is arranged within a pan or guard D.

E represents a lard gage, consisting of a vertical scale F, attached to the outer surface of the cooler, a float G located within the cooler and held in place by duplicate vertical guides H, a grooved roller I at the top of the cooler, and an indicating-weight J, connected by a cord or wire K with the float. This float G rests upon the surface of the lard in the cooler and the height of the surface is indicated by the indicating weight J, which travels over the graduated gage plate F.

The water-gage L is employed in connection with the cooler to indicate the amount of water contained therein, and by deducting the height of water from that of the combined water and lard, as shown by the indicator, the precise quantity of lard in the cooler may be determined.

The cooler is provided with a cap M in which is arranged a screen N.

O designates a funnel provided with a conducting tube P having a flared and perforated base Q which rests upon the bottom of the cooler.

N designates the screen arranged in the neck of the cap above the funnel; and T represents the lid which closes the upper end of said neck.

U represents the steam or water inlet pipe.

It will be understood that this device is of special advantage in determining the quantities of two liquids contained in the same vessel, when said liquids are of different specific gravities, whereby the line of meeting of the two liquids is well defined.

Referring to Fig. 5, *a* indicates the surface of the lard, upon which rests the float of the indicator, the amount of lard being shown by the heavy shading. *b* indicates the dividing line between the water in the bottom of the vessel and the lard, and *c* shows the same dividing line in the water gage. Thus the pointer of the indicating device shows in gallons or barrels upon the scale the amount of water and lard combined. The water gage indicates to the observer the dividing line between the water and lard, and hence, by comparison with the scale, the quantity of water, and the difference between the total amount, as shown by the indicator, and the amount of water as shown by the gage will be the amount of lard.

Having thus described my invention, what I claim, and desire to secure by Letters Patent, is—

A lard cooler having a containing vessel provided near the bottom with an exposed water gage to indicate the height of the water, and a float-indicator to show the quantity of combined water and lard, whereby the difference between the amount of water and the total amount will show the quantity of lard contained in the vessel, substantially as specified.

In testimony that I claim the foregoing as my own I have hereto affixed my signature in presence of two witnesses.

WILLIAM H. DEEMER.

Witnesses:
H. H. HAVEN,
R. M. WILSON.